United States Patent [19]
Carpenter

[11] Patent Number: 4,953,956
[45] Date of Patent: Sep. 4, 1990

[54] LIQUID PRISM DEVICE

[76] Inventor: David J. Carpenter, 3309 4th St., Boulder, Colo. 80302

[21] Appl. No.: 205,367

[22] Filed: Jun. 10, 1988

[51] Int. Cl.$^5$ .......................... G02B 3/14; G02B 5/04
[52] U.S. Cl. ..................................... 350/419; 350/286
[58] Field of Search ....................... 350/418, 419, 286; 356/134

[56] References Cited

U.S. PATENT DOCUMENTS

| | | | |
|---|---|---|---|
| 2,483,102 | 9/1949 | Pierson | 356/134 |
| 2,836,101 | 5/1958 | de Swart | 350/419 |
| 3,514,192 | 5/1970 | de la Cierva | 350/418 X |
| 3,606,523 | 9/1971 | Taylor et al. | 350/419 X |
| 4,270,981 | 6/1981 | Stark | 350/418 X |
| 4,381,895 | 5/1983 | Hughes et al. | 356/134 |
| 4,614,405 | 9/1986 | Brandenberg et al. | 350/418 X |

FOREIGN PATENT DOCUMENTS 726402  3/1955  United Kingdom ................ 356/134

OTHER PUBLICATIONS

Murty, M. et al., "Simple Method for Measuring the Refractive Index of a Liquid", *Optical Engineering*, vol. 18, No. 2, Mar. Apr. 1979.

*Primary Examiner*—Scott J. Sugarman
*Attorney, Agent, or Firm*—John E. Holder

[57] ABSTRACT

An optical device including a fluid filled prism that has flexible side wall portions to provide a variable lens system in conjunction with the prism. The device has translucent side walls formed in a trough shape with an open top side for conveniently changing the fluid in the prism body and thoroughly cleaning the interior side walls of the prism. The side walls of the prism are flexible through a range of spacings to provide a lens effect variation from concave to convex.

13 Claims, 1 Drawing Sheet

LIQUID PRISM DEVICE

BACKGROUND OF THE INVENTION

1. Field of the Invention

The present invention pertains to an optical apparatus and more particularly to an optical apparatus which is arranged to provide a water prism having arcuately adjustable side walls for forming lens faces on said prism.

2. History of the Prior Art

Water prisms have long been known as an apparatus for refracting light waves propaged through such a prism. Water prisms themselves at least go back to the time of Johann Wolfgang Von Goethe (1749-1832) who used water prisms to study the spectral effects on light passing through the refracting surfaces of the prism. It was early discovered that a water prism was less expensive to construct because it did not involve the forming of a primodic shape from a solid material having optical qualities but rather only required flat glass surfaces forming a triangularly shaped closed container which could be filled with a liquid medium such as water to provide the body of the prism. Typically in such water prisms, a means was provided for filling and emptying the prism. A prism such as described above is shown in U.S. Pat. No. 71,309 which was granted to Bart Kane on Nov. 26, 1867.

Another U.S. Pat., No. 1,264,374 which was granted to Luis de Florez on April 30, 1918, shows a liquid filled prism having rigid closed sides and which included a system for varying the density of a medium filling the prism and thereby varying the refraction of light waves passing through the prism. The density of the fluid medium is varied by varying the pressure of the fluid filling the prism.

R M. Pierson, in U.S. Pat. No. 2,483,102, shows a refractometer for automatically measuring and monitoring the refractive quality of a given fluid which might be caused by changes in pressure, temperature, or chemical properties of the fluid. The Pierson device has rigid enclosed walls and utilized a photosensitive device to monitor the refractive angle of a beam of light passed through the prism.

On Apr. 11, 1971, U.S. Pat. No. 3,655,274 issued to D. R. Graig shows a gravity operated liquid filled prism device comprised of two enclosed chambers, each having a boat positioned therein, with the boats being constructed of optical materials. The effect of gravity on the angular position of the optical boats is used to make corrections in roll movements of vehicles, for directing a plumb, or for vertical visual orientation.

All of the prior art devices described above are constructed with rigid side walls for enclosing a liquid and do not provide for the convenient changing of the fluid material and convenient cleaning of the interior surfaces of the prism if it is desired to change from one fluid to another. In addition it is also not possible to readily remove small air bubbles which form on the side walls of the prism and which tend to alter the optical qualities of the side walls. Also, the rigid construction of the side walls does not permit any angular deviation of the side walls, should this be desirable. U.S. Pat. No. 3,606,523 to G. W. Taylor entitled "Fluid Variable Light Deflector", discloses apparatus for selectively changing fluids including using air under pressure to purge fluids from a liquid filled lens or prism, such fluids having differing refractive indices so as to vary a light path passing through such lens or prism.

Another patent which discloses a fluid filled lens is U.S. Pat. No. 1,739,478 to Bielecki. A series of tubes and valves are connected to a lens so that fluids of varying color and density are used to fill the body of the lens in order to vary the color of light passing through the lens.

O'Leary Pat. No. 2,504,039 shows an adjustable fluid prism wherein the ends, tops and bottoms of the prism are consructed of a bellows-like material which permits the angular adjustment of a pair of transparent panels making up prism walls. A gas or fluid fills the adjustable bellows and light is passed through the transparent panels to vary the refraction of light therethrough for producing a three-dimensional effect in optical applications.

The prior art does not provide a fluid filled optical device whereby a liquid filled prism is open to provide for easily changing the fluid therein and for mechanically cleaning the inner optical walls of the prism. Since one of the purposes of changing fluids in the prism is to provide a variation of optical parameters in relation to varying properties of the fluids, it is therefore important to be able to not only completely purge the replaced fluid from inside the prism, but to further mechanically remove the fluid from the inner surfaces of the prism so as not to leave a residual fluid on the optical wall of the prism. In addition, the formation of bubbles on the optical walls is readily remedied if one can mechanically scrape the interior prism walls. By having a prism system which permits ready access to the interior optical walls of the prism, this advantage is accomplished.

A further drawback of prior art devices relates to the absence of a means for varying the radius of curvature of the walls of a prism and thereby provide a means for adjusting the optical configuration of the walls of a prism. Such a provision for varying the light bending characteristics of the walls enhances the experimental aspects of an optical prism device as well as providing an infinite range of variability to the modification of light transmission through the optical device, so that not only can the fluid body of the prism be varied and therefore the optical qualities of the prism thus associated, but also the surface of the prism walls can be curved through an infinite range to thereby also modify its optical qualities. It is with these criteria of features in mind that the present invention has evolved.

The devices shown herein as prior art, in addition to the shortcomings set forth above, do not offer the combination of optical variations which are needed to provide the experimental characteristics of the optical device of the present invention. Another general drawback of such prior art devices is their complexity of structure and design. It is one of the major objects of the present invention to provide an inexpensive yet effective device for performing a variety of optical experiments and to give the experimenter, and in particular the younger science student, the ability to provide a myriad of optical variations so as to go beyond the "standard" optical experiments. To provide an inexpensive apparatus to this end is most important and is effectively achieved with this invention.

SUMMARY OF INVENTION

It is therefore an object of the present invention to provide a new and improved optical apparatus for adjusting a variety of parameters affecting the tramsmission of light through a prismatic structure. A prism is provided by a pair of translucent side walls joined along their bottom edges and spaced at their top edges to form a "V" shaped trough. The ends of the "V" shaped walls are sealingly covered to enclose the trough so as to hold a fluid and thereby provide a fluid prism. The top of the trough is open to permit ready access to the interior of the trough for easily changing the fluid and for permitting the interior of the prism to be adequately purged of one fluid in order to replace it with another fluid of differing optical characteristics. A compression fit cover for the top of the trough provides a cover means that is easily removed and replaced to keep fluids from spilling from the prism in transit or to prevent contamination of the fluid therein from the environment outside of the prism.

A mechanism is provided for selectively adjusting the distance between the top edges of the side walls of the prism. Such adjustment enables one to utilize planer walls in the prism or to generate a concave or convex lens wall system, with the degree of curvature of the lens being selectively variable. The prismlens system is mounted on a stable base to permit its convenient use in a variety of experiments and applications.

DESCRIPTION OF THE PREFERRED EMBODIMENTS

Figure 1:
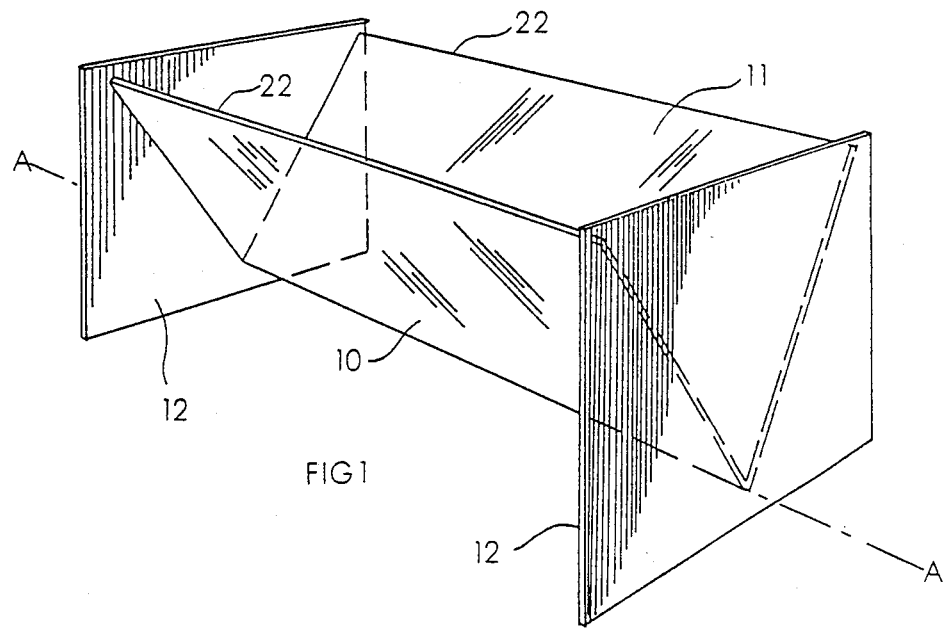
FIG. 1 is a perspective view of a fluid prism device in accordance with the present invention.

Referring first to FIG. 1 of the drawings, a prism of simple and inexpensive construction in accordance with the present invention is shown having a "V" shaped prismatic portion comprised of translucent side walls 10 and 11 formed from rectangular pieces of material such as a cast acrylic material, like that sold under the trade name Plexiglas. One method of making the trough is to bend a single rectangular piece of Plexiglas along an axis A-A at an appropriate angle to form the side walls 10 and 11. Another construction technique would be to join a pair of side wall pieces along their bottom edge portions with an adhesive, sealant or the like to form the axis A—A, and having their top edges spaced to form the "V" shaped trough. End plates 12 are shown enclosing the trough. Such end plates are also attached to each of the ends of the "V" shaped trough with an adhesive or the like to sealingly enclose the trough in order to provide a fluid tight enclosure. The end plates are shown made of a rectangular piece of material which can also be constructed of acrylic.

The bottom edge of the end plate should be flat to provide a stable resting surface for the device.

Figure 2:
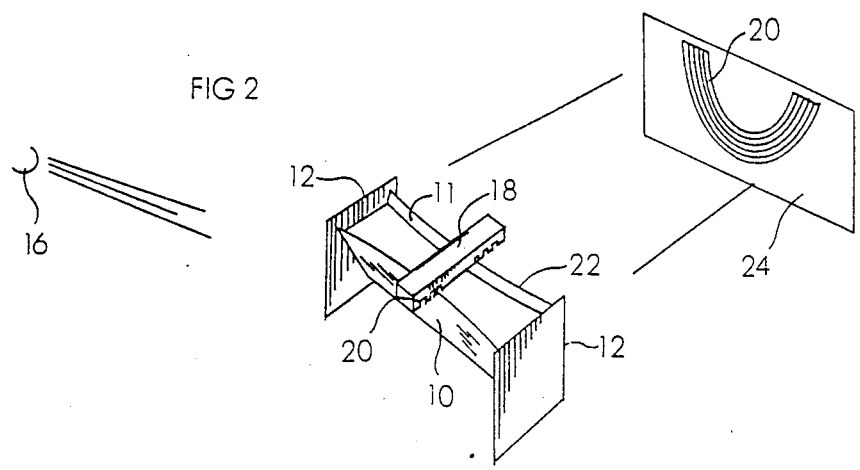
FIG. 2 is a perspective view of the device of FIG. 1 in a prism system showing a light source a projected image and a means for adjusting the curvature of the prism walls.

Referring next to FIG. 2, the apparatus of FIG. 1 is shown having a spreader block 18 with an array of transverse notches 20 formed across the bottom surface of the block. The notches 20 are sized to fit over the top edges 22 of the side walls 10, 11. The block 18 is thereby used to expand or contract the dimension "a" (FIG. 3) between the central portions of the top edges 22 of the side walls, and hold the top side wall edges in such expanded or contracted condition. A light source 16 is shown projecting a beam of light toward the prism device and a projected image 20 is shown projected onto a screen or the like 24 on the opposite side of the prism device. The interior of the prism is filled with a fluid for providing the body of the prism device. It is readily seen that such a fluid may be conveniently changed because of the open top side of the prism and that the interior surfaces of the side walls and end plates may be mechanically cleaned to completely purge a fluid from the prism before replacing it with another fluid. A cover (not shown) may be provided for the open top of the prism, such cover having a compression joint along each longitudinal edge portion for matingly connecting to the top edges 22 of the side walls.

Figure 3:
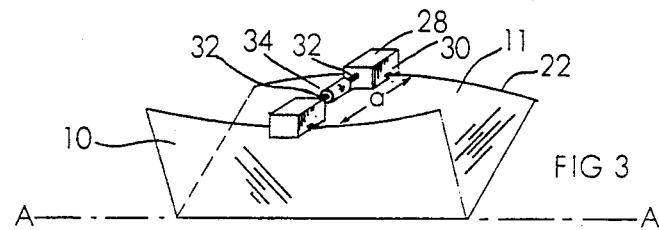
FIG. 3 is a perspective view of an alternative means for adjusting the curvature of the prism walls.

Referring next to FIG. 3 an alternative arrangement is shown for varying the dimension "a" between the center portions of the upper edges 22 of the side walls 10, 11 of the device. The dimension varying means is comprised of edge blocks 28 having a transverse slot sized to fit over the top of edge portion 22 of the side walls. Connecting rods 32 are shown connected to each of the edge blocks 28. The connecting rods 32 are threaded and are threadedly received into opposite female threaded ends of an adjusting nut 34. The threads on the connecting rods 32 and the nut 34 are arranged so that rotation of the nut 34 on the rods 32 causes the rods 32 to move in opposing directions. Thus, for example, if the nut 34 is rotated in a clockwise direction, the rods are screwed out of the nut 34, as shown by the dimensional arrows in FIG. 3, to increase the dimension "a" and thereby curve the edges 22 outwardly to form a convex lens of the side walls 10, 11. Adjustment of this dimension "a" between the side walls will of course cause changes in the behavior of the prismlens system of this device and thereby vary the projected image 20 shown in FIG. 2.

In the use of the apparatus described above, it is seen that a great variety of experiments and applications can be derived from a relatively inexpensive and simple device. For example, in the field of spectral analysis, light passing through the prism, as suggested by the illustration in FIG. 2, will display a colored spectrum such as a rainbow associated with a particular light source. The study of the spectral separation of the light helps to determine the specifics of the light source. Such a spectral effect can also be observed by looking at any image through the prism. Careful observation reveals color occurring on the contrasting edges of specific images. The refracted images projected through the prism are objectively observed on a screen or the like 24 as displaced (refracted) vertically. The refractive index of the fluid which is used to fill the prism trough is determinative of the degree to which the image is refracted thus providing a system for analysis which is suitable for determining the quality, type and temperature, for example, of a particular fluid. By changing the color of the fluid in the prism, the spectral effect of subtractive filters may be studied. In addition, when the fluid is dyed, the images viewed subjectively through the prism take on the same hue, adding to the versatility of color study. Light projected through the prism, when filled with a liquid of a particular color, presents an objective spectrum that is weighted toward that particular color.

The provisions, associated with this device, for varying the dimension "a" between the side walls, further provides a means for comparing and measuring the effect of concave and convex lens systems, when the side walls are flexed in and out. For example, when the side walls are flexed in to form a concave lens, the prism projects a large semi-circular rainbow. Convex imaging displays the concentrating nature of a lens. The resultant effect on the spectral image is a recombination of the colors into a bright light contrasting the darker background. Of particular experimental or educational value is the ability to slowly make the transition from a concave lens system through a regular prism and then into a convex lens system. This progression displays the particular bending patterns of the light and increases the understanding of lenses and prisms. The ability with this apparatus to direct and focus refracted or reflected light rays provides a unique tool for use in experimental and educational uses. While the apparatus disclosed herein, particularly because of its inexpensive and simple construction is particularly useful as an educational tool, it is readily seen that the applications, from a more technical standpoint, are numerous.

Therefore, while particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

I claim:

1. An apparatus for producing an effect on light passing through portions of the apparatus, comprising:
   a container formed of a pair of rectangular plates joined along one longitudinal edge thereof to form an upright "V" shaped trough, said plates having their other longitudinal edges spaced to form the upper ends of the angularly spaced legs of the "V" shape, said plates each having at least a portion being translucent;
   end cap means sealingly enclosing the end edges of the plates to form a V shaped trough with its open side facing upwardly and ends enclosed so as to hold a fluid therein, said end caps being rigid to hold the lateral edges at the ends of the plates in a fixed configuration.

2. The apparatus of claim 1 wherein said plates are constructed of a pliable material and further including means for varying the distance between said other longitudinal edges of said plates near the center portion of said other longitudinal edges.

3. The apparatus of claim 2 wherein said varying means is comprised of a spreading means having a plurality of edge holding surfaces for holding said other longitudinal edges at a plurality of selected fixed distances from one another.

4. The apparatus of claim 3 wherein said varying means is comprised of a spreading member having two end portions attached to each of said plates at a point along their other longitudinal edges, and means for changing the distance between the points where said spreading member is attached to said plates.

5. The apparatus of claim 4 wherein said changing means includes a mechanism for infinitely varying such distance between the center portion of said other longitudinal edges of said plates.

6. The apparatus of claim 1 wherein said pair of plates is comprised of a unitary piece of plastic material which is bent along its centerline to form a trough having an acute angle.

7. The apparatus of claim 1 wherein said end caps have at least one flat edge thereon which flat edge is aligned with a plane perpendicular to a line bisecting the angular "V" shape of said trough, and positioned below said trough when the open side of said trough is facing upwardly.

8. An optical system incorporating a fluid prism, comprising:
   a pair of translucent side walls joined along their bottom edges and having their top edges spaced to form a "V" shaped trough, end members sealingly enclosing the trough and fixing the spacing between the ends of the side walls, and means spanning the top open side of the trough and attached to the top edge of the side walls for adjustably varying the distance between the top edge of the side walls and thereby vary the curvature of the side walls.

9. The optical system of claim 8 wherein said adjustably varying means includes a screw mechanism for varying the distance between the top edge of side walls through an infinite number of discreet positions.

10. An optical liquid prism apparatus for manipulating the propagation of light through a fluid medium enclosed within the prism, apparatus comprising:
    at least two substantially rectangular side members, at least a portion of said side members being translucent for passing light, said side members being joined at an angle along at least one edge thereof to form the bottom angle of a "V" shaped trough, and with the other edges of the side members being spaced to form the top edges of the trough;
    end members sealingly secured to said side members; and
    at least one of said end members having a flat surface disposed in a plane, perpendicular to a line bisecting the angle between said joined side members and disposed below the bottom angle of the trough to provide a means for maintaining said trough in a stable upright position, having the point of the "V" shape pointing down;
    said side members being made of a flexible material permitting portions of the side members between the end members to be bent to vary the optical configuration of said side members.

11. The apparatus of claim 10, wherein the end members are constructed of material which is rigid in compression so that when pressure is applied to said side members to bend said side members, said end members are maintained rigid.

12. The apparatus of claim 11, wherein said side members are so arranged that when pressure is applied to said side members near the portion midway between the end members, said side members are thereby curved to form a lens and thereby vary the optical effect on light passing through said side members.

13. The apparatus of claim 10, wherein said trough is filled with a fluid medium.

* * * * *